Reissued Dec. 20, 1932

Re. 18,700

UNITED STATES PATENT OFFICE

KOKICHI MIKIMOTO, OF GINZA, KYOBASHI-KU, TOKYO-SHI, JAPAN

PROCESS FOR THE PRODUCTION OF PERFECTLY SPHERICAL CULTURE PEARLS

No Drawing. Original No. 1,847,128, dated March 1, 1932, Serial No. 537,507, filed May 14, 1931. Application for reissue filed August 26, 1932. Serial No. 630,609.

This invention relates to improvements in the process for the production of culture pearls and has for its object to provide an improved process whereby perfectly spherical culture pearls can be obtained.

In the culture pearl production, one process of causing a nucleus to become covered by layers of nacreous substance is known. This known process consists in covering the nucleus for need of a very smooth surface, with a single layer of a slightly stretched piece of the mantle of a living pearl-oyster, by binding the closing end with a draw string, cutting away the surplus part of the mantle piece to cover the whole surface of the nucleus, and at the same time removing the draw string. It is thus ensured that the nucleus will be kept covered over its whole surface with the mantle piece without the use of any draw string due to the contractibility of the mantle. The nucleus is then forcibly inserted into a suitable location in the anatomy of the mantle of another living pearl-oyster for causing the culture of the pearl through a slight cut purposely formed thereon.

In general, the mantle of the living pearl-oyster is too stout and of too great contractibility to cover the nucleus over its whole surface so as not to form any wrinkle without danger of damaging the mantle by stretching. It is very difficult, therefore, to obtain beautiful culture pearls having smooth surfaces, because of the presence of the wrinkles on the mantle cover of the nucleus. Furthermore, the cut end of the surplus part of the mantle cover will tend to open somewhat due to the great contractibility of the mantle if the surplus part is entirely cut away. In order to avoid this disadvantage, the surplus part of the mantle cover is required to be cut away so as to reserve some margin. It is very difficult, however, to reserve the margin just enough not to form any opening, so that some surplus margin may be occasionally preserved, which will cause the produced culture pearl to present a protuberance on its surface.

This invention is intended to eliminate the aforesaid disadvantages by the use of a nucleus having a less smooth, or rough surface instead of the very smooth surface, and less stiff, or pliable, mantle of relatively poor contractibility instead of the great contractibility generally in use heretofore. This mantle can be obtained from pearl-oysters specially cultured for that purpose as hereinafter described in detail, or it may be obtained from oysters which have only recently spawned, the mantle of such oysters having been found to become transparent and less stiff, or pliable. When such a less stiff, or pliable, mantle and less smooth, or rough, nucleus are used, the nucleus can be closely covered by the mantle, no uncovered spot and wrinkle being found, though the surplus part of the covering mantle is cut away without preserving any margin for providing against the tendency of a spot being uncovered at the cut end of the surplus part of the covering mantle, the rough surface of the nucleus serving to ensure the close contact with the mantle cover. Consequently a perfectly spherical culture pearl corresponding to a spherical nucleus can be produced.

To specially culture the pearl-oysters so that their mantles become transparent and pliable, the pearl-oysters are kept in a basket suspended in deep water, which basket is constructed to exclude the sun as far as possible whilst a water circulation is permitted therein.

In my process, a valve of the shell of the living pearl-oyster, having the transparent and pliable mantle as above described, is removed from another valve to expose the animal with the mantle cover, the adductor being separated from the removed valve by means of a knife or the like inserted between the shell and the animal through a slightly opened crevice between the two valves. The rough surface nucleus is then put on the mantle which is slightly contracted at that time. The nucleus is then covered by the mantle by gently stretching the same, and is bound at the closing end with a draw string or like, keeping the mantle in the stretched condition. After some time, the surplus part of the mantle covering the nucleus is cut away, the draw string being removed at the same time, since the nucleus will be kept completely covered by the mantle without any draw string due to the constrictive action of the mantle. The wrinkles of the mantle cover are then satisfactorily smoothed out. The mantle-covered nucleus thus provided is forcibly inserted into a suitable location in the anatomy of the mantle of another living pearl-oyster for the culture of the pearl, the insertion being made through a suitable cut purposely formed at the mantle by suitably opening the valves at one end. The living pearl-oyster bearing the mantle-covered nucleus forcibly inserted into the mantle will be kept in water, and thereby the perfectly spherical culture pearl will be produced.

Having now particularly described and ascertained the nature of my said invention and in what manner the same is to be performed, I claim:

In culture pearl production, a process comprising covering a nucleus of suitably rough surface by a single layer of a piece of the pliable and relatively poorly contractive mantle of a selected living pearl-oyster by binding the closing end with a draw string, cutting away the whole surplus part of the mantle cover and removing the draw string and inserting the mantle-covered nucleus into a suitable location in the mantle of another living pearl-oyster.

In testimony whereof I have signed my name to this specification.

KOKICHI MIKIMOTO. [L. S.]